US006098057A

United States Patent [19]

Dlugos

[11] Patent Number: 6,098,057

[45] Date of Patent: Aug. 1, 2000

[54] METHOD AND APPARATUS FOR BATCH MAIL PROCESSING WITH INTEGRATED SCALE AND AUTOMATIC MANIFEST COMPILATION

[75] Inventor: Daniel F. Dlugos, Shelton, Conn.

[73] Assignee: Pitney Bowes Inc., Stamford, Conn.

[21] Appl. No.: 08/998,177

[22] Filed: Dec. 24, 1997

[51] Int. Cl.[7] .................................................. G06F 17/00

[52] U.S. Cl. .................................................. 705/407

[58] Field of Search .................................. 705/407, 408, 705/409, 403; 235/375, 380; 364/478.09, 478.15

[56] References Cited

U.S. PATENT DOCUMENTS 4,787,046 11/1988 Feinland et al. ........................ 705/407
5,001,648 3/1991 Baker ...................................... 705/407
5,153,842 10/1992 Dlugos, Sr. et al. .............. 364/478.15

*Primary Examiner*—Emanuel Todd Voeltz
*Assistant Examiner*—Thomas A. Dixon
*Attorney, Agent, or Firm*—Charles R. Malandra, Jr.; Michael E. Melton

[57] ABSTRACT

A method and apparatus for processing mail pieces by a mailer for mailing by a postal facility utilizes a manifesting system to evidence payment by the mailer to the postal facility for the cost of the mailing. A discrete batch of mail is identified, and each piece in the batch is weighed in succession by a scale which includes a first data processing means and a first data base, and the weight is entered in the first data base, optionally together with other information that is pertinent to the cost of mailing. A first printer collocated with the scale prints a unique number for each mail piece. A second data processing means having a second data base receives the information from the first data base and generates a compilation of the unique numbers, the weight, other optional pertinent information, if any, and the compilation is converted into a user functional form which can be delivered to a postal facility as evidence of payment by the mailer for the cost of mailing the mail pieces in the batch by the postal facility.

20 Claims, 3 Drawing Sheets

FIG. 3

USPS MAILING MANIFEST
MIXED CLASSES - SINGLE PIECE

MAILER'S NAME & ADDRESS :

TRANSCAPE EAST
1 ANY STREET

MEMPHIS, TN 38188

PAGE : 5
MANIFEST DATE : 10 / 02 / 96
MANIFEST NUMBER : 10
PERMIT NUMBER : 123 - 456
MAILING POST OFFICE :
MEMPHIS, TN POST OFFICE

| PIECE ID | WEIGHT ( LPS. ) | OVR SIZ | RATE CODE | ZIP | ZN | BASE CHG | OPTIONS | TOTAL FEES | TOTAL POSTAGE |
|---|---|---|---|---|---|---|---|---|---|
| 123607 | 0.1300 | | 1 | 442 | | 0.780 | | 0.00 | 0.780 |
| 123608 | 5.0000 | | B1 | 723 | 1 | 2.650 | | 0.00 | 2.650 |
| 123609 | 0.2500 | | 1 | 981 | | 1.010 | RG INS | 17.10 | 18.110 |
| 123610 | 0.1900 | | 1 | 024 | | 1.010 | | 00.0 | 1.010 |
| 123611 | 7.0000 | | BR | 838 | 7 | 10.900 | INS | 0.75 | 11.650 |
| 123612 | 14.0000 | | BS | 040 | | 6.410 | | 0.00 | 6.410 |
| 123613 | 22.1300 | | B1 | 723 | 1 | 3.910 | | 0.00 | 3.910 |
| 123614 | 1.0600 | | B1 | 722 | 2 | 2.310 | | 0.00 | 2.310 |
| 123615 | 0.2500 | | 1 | 351 | | 1.010 | | 0.00 | 1.010 |
| 123616 | 6.0000 | | BR | 290 | 4 | 4.390 | COD | 6.50 | 10.890 |
| 123617 | 0.0600 | | 1 | 720 | | 0.320 | C RR | 2.20 | 2.520 |
| 123618 | 20.5000 | | 1P | 350 | 3 | 12.600 | | 0.00 | 12.600 |
| 123619 | 41.0000 | | BR | 542 | 5 | 14.890 | | 0.00 | 14.890 |
| 123620 | 0.6300 | | A | 216 | | 2.620 | | 0.00 | 2.620 |
| 123621 | 0.1300 | | 1 | 838 | | 0.780 | | 0.00 | 0.780 |
| 123622 | 29.0000 | | BS | 760 | | 11.060 | | 0.00 | 11.060 |
| 123623 | 1.4400 | | BB | 543 | 5 | 1.660 | | 0.00 | 1.660 |
| 123624 | 0.0300 | Y | A | 852 | | 0.430 | | 0.00 | 0.430 |
| 123625 | 34.0000 | | BR | 315 | 4 | 8.570 | INS RR | 5.40 | 13.970 |
| 123626 | 10.0000 | | BR | 838 | 7 | 11.310 | | 0.00 | 11.310 |
| 123627 | 6.2500 | | BS | 734 | | 4.240 | | 0.00 | 4.240 |
| 123628 | 33.0000 | | BR | 637 | 2 | 4.680 | | 0.00 | 4.680 |
| 123629 | 35.0000 | | BR | 352 | 3 | 7.910 | COD | 7.50 | 15.410 |
| 123630 | 69.0000 | | BR | 359 | 3 | 9.340 | | 0.00 | 9.340 |
| 123631 | 34.1300 | | B1 | 383 | 2 | 4.440 | | 0.00 | 4.440 |
| 123632 | 0.5000 | | A | 040 | | 1.930 | | 0.00 | 1.930 |
| 123633 | 35.0000 | | B1 | 723 | 1 | 4.440 | | 0.00 | 4.440 |
| 123634 | 39.6900 | | BR | 838 | 7 | 23.190 | INS | 0.75 | 23.940 |
| 123635 | 0.4400 | | A | 063 | | 1.930 | | 0.00 | 1.930 |
| 123636 | 4.0600 | | BR | 006 | 8 | 5.950 | | 0.00 | 5.950 |
| 123637 | 1.5000 | | 1P | 355 | 3 | 3.000 | | 0.00 | 3.000 |
| 123638 | 25.6300 | | BR | 637 | 2 | 4.370 | | 0.00 | 4.370 |
| 123639 | 0.5600 | | A | 020 | | 2.160 | | 0.00 | 2.160 |
| 123640 | 3.0000 | | 1P | 838 | 7 | 4.000 | | 0.00 | 4.000 |
| 123641 | 15.0000 | | B1 | 723 | 1 | 3.450 | | 0.00 | 3.450 |
| 123642 | 33.2500 | | 1P | 838 | 7 | 32.900 | RG | 12.20 | 45.100 |
| PAGE TOTALS: 36 | 528.8100 | | | | | $216.55 | | $52.40 | $268.95 |
| CUMULATIVE TOTALS: 180 | 2954.9400 | | | | | $1,211.74 | | $191.55 | $1,403.29 |

RATE CODES:
1P-PRIORITY MAIL, 1-FIRST CLASS, A-STD MAIL (A), B1-INTRA BMC, BR-INTER BMC, BD-DEST BMC, BS-SPECIAL STD, BL-LIBRARY, BS-SOUND PTD MATTER

OPTIONS:
COD-COD, RG-REGISTERED, C-CERTIFIED, RR-RETURN RECEIPT, RRM-RETURN RECEIPT FOR MERCHANDISE, INS-INSURED, RD-RESTRICTED DELIVERY, SH-SPECIAL HANDLING, SD-SPECIAL DELIVERY, PAL-PARCEL AIR LIFT

METHOD AND APPARATUS FOR BATCH MAIL PROCESSING WITH INTEGRATED SCALE AND AUTOMATIC MANIFEST COMPILATION

BACKGROUND OF THE INVENTION

The present invention relates generally to the field of mailing, and more particularly to a method of, and apparatus for, processing mixed weight mail pieces by a mailer for mailing by a postal facility utilizing a manifesting system to evidence payment by the mailer to the postal facility for the cost of the mailing.

The system of mail preparation utilizing postage meters has long been well known and has met with enormous commercial success. Prior to the advent of the postage meter, the only means by which payment to the then federal governmental Postal Service could be evidenced was the purchase of stamps by the mailer from the Postal Service which were affixed to mail pieces. As population, business activity and the need to communicate by mail grew rapidly in the early part of the century, the postage meter was developed to circumvent the need to affix stamps purchased from the Postal Service prior to depositing mail with a local Post Office.

The underlying theory of the postage meter is that there is a printing mechanism that can print a unique indicia on an envelope that is placed in or fed through the postage meter, the indicia having been approved and accepted by the Post Office Department, and later the United States Postal Service (USPS), as evidence of payment by a mailer for the privilege of having his mail piece carried through the mailing system. The postage meter includes any one of a number of mechanisms for accounting to the mailing facility for payment for the privilege of printing the postage indicia, typically in the form of a pre-payment system in which the accounting mechanism includes a settable register in which the postal facility, upon receipt of payment, sets to dispense a predetermined amount of money, e.g., $100.00, in varying increments. The accounting mechanism also includes a suitable lockout means which prevents operation of the postage meter when the postage credit remaining drops below the maximum amount of postage which can be printed by the postage meter, e.g., $0.99. Thus, the theory of the security of the postage meter system was that the mailer could only print postage indicia up to the amount of money which he had paid in advance to have his meter set by the postal facility.

Again, as population increased and business activity became even more complex, and the need developed for faster and more automated systems for evidencing payment for postage, various developments were made to meet this need. One development was that postage meters were incorporated into machines that would feed a succession of envelopes at high speed to and through the postage meter, thereby creating the mailing machine, with the result that hundreds, or even thousands, of mail pieces could be processed to have postage indicia printed thereon in rapid succession in the course of an hour. During the last couple of decades, electronic postage meters gradually replaced mechanical meters, and sophisticated systems were developed by which postage meters could be reset remotely via telephone communication between a mailer's postage meter and the postal facility, thereby eliminating the inconvenience and time required for a mailer to bring his postage meter to the Post Office for resetting, with payment for the postage credit transferred to the meter being charged in advance to accounts maintained by mailers with the postal facility. With the advent of more sophisticated electronic technology, it became possible to combine an electronic postage meter and an electronic scale into an integral unit, so that mail pieces could be weighed "on the fly" as they moved through a mailing machine, and the meter would automatically be set to print a postage indicia showing the appropriate amount of postage. Such machines permitted still further increases in the speed, and therefore the volume in a given period of time, at which mail could be processed for mailing.

The problem that still persisted throughout the development of postage meters and high speed mailing machines that included postage meters was that they were ideally suited only for handling large quantities of identical or similar sized mail, e.g., standard No. 10 business envelopes and other closely sized envelopes. These machines could not readily handle, if even at all, a succession of mixed mail pieces that varied greatly in size or weight, and could not handle packages at all. Some of the more complex and costly mailing machines included the capability of printing postage indicia on a finite length of a web or tape, typically tape that was gummed on one surface so that it could be moistened, and was then severed from the web and applied manually to a package. Thus, in the case of a high volume mailer who generates mixed mail consisting of greatly mixed sized envelopes and packages, the only method of processing such material for mailing was to apply postage stamps to the mail pieces or utilize mailing machines having the capability of printing postage indicia on discrete lengths of tape and applying the tape directly to the oversized envelopes or packages.

The latter procedure required that an operator manually weigh each piece of mail on a scale to determine the correct amount of postage, enter that amount into a postage meter which would dispense a strip of tape with the postage indicia printed thereon, and then apply the trip of tape to the envelope or package. It is apparent that such a procedure is slow and cumbersome, and does not lend itself readily to high speed and high volume mailing.

A partial solution to this problem, as disclosed and claimed in U.S. Pat. No. 4,787,046, issued Nov. 22, 1988 to Feinland et al, and assigned to the assignee of this application, was to combine a postage meter with an electronic scale in such a manner that the postage meter is mounted on the scale and becomes part of the tare weight of the scale, which then controls the operation of the postage meter in accordance with the weight of mail piece fed through the postage meter, or placed on top of the postage meter if it is too thick to be fed through the postage meter. This system was highly efficient in terms of handling small quantities of mail, but it was cumbersome and slow, and did not lend itself to high speed, high volume mixed size mailing applications.

A further partial solution to this problem is the manifesting system as disclosed and claimed in U.S. Pat. No. 5,001,648, issued Mar. 19, 1991 to Baker, in which a succession of mixed weight and size mail pieces are weighed to determine the amount of postage that is required, and a unique number is printed for and on each mail piece, and by utilizing suitable computer techniques, a manifest is created which associates mailing charges for each mail piece with the unique number assigned to that mail piece. By suitable computer techniques, and under appropriate procedural safeguards to ensure accuracy and prevent fraud, the manifest is printed out and is accepted by the postal facility as evidence of payment by the mailer for the postage covered by the manifest. Although the theory behind the manifesting system as disclosed in the patent was sound, the implementation of that theory contained several procedural deficiencies and equipment design problems, such as cumbersome and time consuming manual handling of mail and multiple opportunities for error, which resulted in overall little improvement in the speed and efficiency in handling mixed size and weight mail over what was currently available.

Thus, prior to the present invention, there remained a need for a mail handling system based on the theory of the manifesting system as approved and accepted by the USPS which would represent a significant improvement in the speed and efficiency of handling large quantities of mail pieces of mixed size and weight, and which would enable both high volume mailers and the postal facility to solve problems experienced with currently available equipment and systems.

SUMMARY OF THE INVENTION

The present invention substantially alleviates if not entirely eliminates the foregoing problems and disadvantages of prior bulk mixed size and weight mail handling equipment and manifesting systems by providing a method and apparatus for accomplishing the processing of mail pieces by a mailer for mailing by a postal facility utilizing an improved manifesting system to evidence payment by the mailer for the cost of the mailing. This is accomplished in the present invention by the practice of a unique series of steps involving a unique combination of mechanical and electronic components.

In its broader aspects, the method of the present invention is a method of processing mail pieces by a mailer for mailing by a postal facility utilizing a manifesting system to evidence payment by the mailer to the postal facility for the cost of the mailing, and comprises the steps of identifying by the mailer a discrete batch of mail pieces to be processed for mailing by the postal facility, weighing each mail piece of the batch in succession to determine its weight, and entering data, comprising at least the weight of each mail piece, pertinent to the cost of mailing each mail piece into the data base of a data processing instrumentality. A unique number is printed on each mail piece, and the number is entered into the data base of the data processing instrumentality in association with the pertinent data for each mail piece already entered. A digital electronic compilation is then generated containing the unique numbers of all of the mail pieces in the batch, together with the data pertinent to the cost of mailing each mail piece in the batch associated with each unique number, and further including the cost of mailing each mail piece as determined by the data processing instrumentality based on the pertinent data. The digital electronic compilation in the data base is then converted into a user functional form, and is transferred in the user functional form to the postal facility in direct or indirect association with delivery of the batch of mail pieces to the postal facility for mailing, whereby the compilation serves as evidence of payment by the mailer to the postal facility for the cost of transporting the mail pieces in the batch by the postal facility.

In its broader aspects, the apparatus of the present invention comprises an apparatus for processing mail pieces by a mailer for mailing by a postal facility utilizing a manifesting system to evidence payment by the mailer to the postal facility for the cost of the mailing, and comprises means for identifying a discrete batch of mail pieces to be prepared for mailing, and weighing means for determining the weight of each mail piece, the weighing means including first data processing means for storing the weight of each mail piece in a first data base.

A first printing means is co-located with and operatively connected to the weighing means for printing at least a unique number for and on each mail piece. A second data processing means is operatively connected to the weighing means for receiving the weight of each mail piece and entering the weight into a second data base, the second data processing means including means for generating a digital electronic compilation of the unique numbers of all the mail pieces in the batch together with the data pertinent to the cost of mailing of each mail piece associated with each unique number, and the cost of mailing of each mail piece as determined by the second data processing means. There is means for converting the digital electronic compilation into a user functional form which can be transferred by the mailer to the postal facility, whereby the compilation serves as evidence of payment by the mailer for the cost of mailing the mail pieces in the batch by the mailing facility.

In some of its more limited aspects with respect to both the method and the apparatus, the unique number is printed either directly on each mail piece, or on a strip of tape which is affixed to a mail piece in the event that the mail piece cannot be physically passed through the printer for the unique number. The printing means for the unique number for each mail piece is disposed directly on top of the weighing means and becomes part of the tare weight of the scale. Also, the compilation can be converted into one of several user functional forms, such as being printed in hard copy form for delivery to the postal facility with the batch of mail, being reproduced in digital electronic form on a portable electronic data medium for delivery to the postal facility with the batch of mail for printing in hard copy form by the postal facility, or by the mailer transferring the data in the compilation by electronic data communication means operatively connected between the mailer's data processing means and a data processing means at the postal facility.

Having briefly described the general nature of the present invention, it is a principal object thereof to provide a new and improved method and apparatus for processing mail pieces by a mailer for mailing by a postal facility utilizing a manifesting system to evidence payment by the mailer to the postal facility for the cost of mailing.

Another object of the present invention is to provide a method and apparatus for processing mail pieces by a mailer utilizing a manifesting system in which the data pertinent to the cost of mailing of the mail pieces is entered into a data base with a minimum of manual handling of the mail pieces to minimize the possibility of error.

Still another object of the present invention is to provide a method and apparatus for processing mail pieces by a mailer utilizing a manifesting system in which the digital electronic compilation comprising the manifest can be converted into a plurality of user functional forms, thereby substantially increasing the utilitarian characteristics of the method and apparatus.

These and other objects and advantages of the present invention will be more apparent from an understanding of the following detailed description of a presently preferred mode of carrying out the invention, when considered in conjunction with the accompanying drawings.

BRIEF DESCRIPTION OF THE DRAWINGS

FIG. 3 is a copy of a page from a print out of a representative digital electronic compilation generated in accordance with the principles of the present invention.

DETAILED DESCRIPTION OF THE PREFERRED EMBODIMENTS

Figure 1:
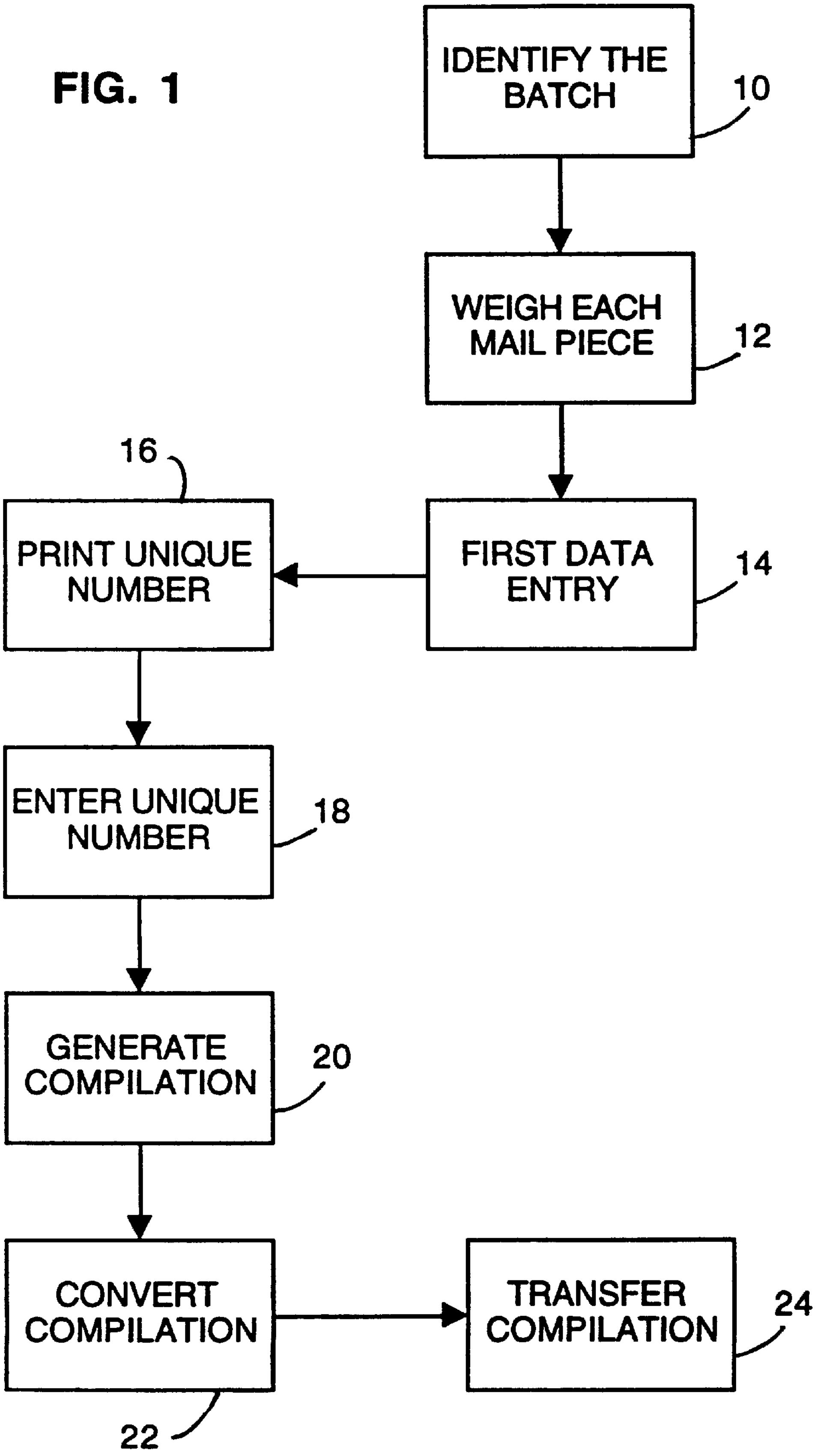
FIG. 1 is a flow chart of the steps carried out in the practice of the method of the present invention.

Referring now to the drawings, and more particularly to FIG. 1 thereof, the method of the present invention comprises a series of steps for the processing of a batch of mail pieces by a mailer for mailing by a postal facility utilizing a manifesting system to evidence payment by the mailer to the postal facility for the cost of the mailing. The method commences with the step of identifying by the mailer a discrete batch of mail pieces to be processed for mailing, and is indicated by the box 10. As will be more fully explained in the description below of the apparatus of the invention, the identification of the batch of mail pieces can be carried out in a number of ways, both manually and by various techniques utilizing hardware. For example, the batch may consist of a number of mail pieces accumulated by the mailer over a period of time and which is counted at the end of that period, or it may consist of the mail created by the mailer in the course of preparing a mass mailing of known quantity. In either event, in order to ensure accuracy in the final count, the quantity of mail pieces is usually counted by some type of automatic counting machine or device, although manual counting is within the scope of the invention. Thus, once this step is accomplished, the mailer has determined that he has, e.g., 100, 500, 1,000, 10,000, etc. mail pieces that will constitute the discrete batch that will be covered by the manifest to be created.

The next step in the method of the invention is that of weighing each mail piece in succession to determine its weight, and is indicated by the box 12. Again, as will be more fully explained below, this can be accomplished in a number of ways, utilizing both manual and machine assisted techniques. For example, in the simplest of techniques, each mail piece in succession is manually placed on the platform of a suitable scale and the weight thereof noted. At the other extreme, the mail pieces are placed in an automatic feeder operatively associated with a scale through which the mail pieces are fed seriatim, and the weight of each piece is automatically entered into the data base of a data processing instrumentality within the scale. Further description of weighing systems for accomplishing this step of the invention are set forth in more detail below. It is sufficient to note at this point only that it is necessary to have an accurate indication of the weight of each mail piece.

The next step in the method of the invention is that of entering data pertinent to the cost of mailing each mail piece into the data base of a data processing instrumentality, and this step is indicated by the box 14. In a very simplified system in which the cost of mailing each mail piece is based solely on the weight thereof, the weight and class are therefore the only items of pertinent data that need be entered into the data base. Again, as more fully explained below, this can be accomplished either manually through any suitable form of alpha-numeric digital input device connected to the data processing instrumentality, or, by means of user operable input devices that are integral with the weighing instrumentality or other data processing instrumentality, and which contains the data base in which the ultimate compilation will be generated. Typically, however, the situation where the only pertinent data is the weight of the mail pieces is unusual, and it is more customary that other information relevant to the cost of mailing will be included in the pertinent data entered into the data base. For example, such other relevant information might include an oversize code, a rate code, a postal ZIP code, a zone code, and fees for any special handling, such as COD, registered, certified with return receipt, etc. All of this information can be entered by either of the above techniques for entering the weight.

Either commensurate with or just after the foregoing pertinent data is entered into the data base, the next step in the method is to print in some fashion a unique number for each mail piece in the batch, and this step is indicated by the box 16. Again, this step can be carried out by a number of techniques further described below, it being suffice for an understanding of the method form of the invention to note at this point only that the number for each and every mail piece in the batch be different in some manner from all of the other numbers since it's function is to identify a particular mail piece. The number may be printed either directly on the mail piece if it is of a physical size that permits it to be fed into or through a suitable printing device, or on a suitable label which is then affixed to the mail piece if the mail piece is too large or bulky to be fed into or through the printing device. The number can be printed merely in a conventional type style format, in alpha-numeric characters that are recognizable by conventional optical character readers, in conventional linear bar code format or two dimensional bar code format, either of which can be scanned by suitable scanning devices as a means of entering the number into a data base as described in the next paragraph.

The next step in the method is to enter the unique number for each successive mail piece into the aforementioned data base of the data processing instrumentality in association with the data pertinent to the cost of mailing of each successive mail piece in the batch, and this is indicated by the box 18. Again, the unique number can be entered manually by a suitable input device or automatically by the same data entry techniques briefly mentioned above for entering the weight and other data pertinent to the cost of mailing.

The next step in the method of the invention is to generate a digital electronic compilation of the unique numbers of all of the mail pieces in the batch, together with the data pertinent to the cost of mailing each mail piece in the batch associated with each unique number, and further including the cost of mailing each mail piece as determined by the data processing instrumentality based on the pertinent data, and this step is indicated by the box 20. Basically, this step is carried out by operating any of a number of suitable computer programs which have the capability of creating a compilation in a desired format for the purpose intended, i.e., serving as evidence of payment by the mailer to the postal facility for the cost of transporting the mail pieces in the batch by the postal facility. Depending on the nature of the computer program, the digital electronic compilation may be created in a sequential or real time manner while the pertinent data and the unique numbers are being entered, or it may be created at one time after entry of all data. In either event, at this point in the method, the desired compilation now exists in the data base of the data processing instrumentality.

The next step in the method of the invention is to convert the digital electronic compilation in the data base into a user functional form, that is, any form which can be utilized by the postal facility for the intended purpose, this step being indicated by the box 22. Thus, this step would include converting the digital electronic compilation into graphic form such as by printing the compilation in hard copy form by a printing instrumentality operatively connected to the data processing instrumentality, or transferring the compilation in electronic form onto a portable electronic data medium such as a floppy disk. In either event, the data making up the compilation in the data base is now in a form which can be functionally utilized by either the mailer or the postal facility.

The final step in the method of the invention is that of transferring the compilation in the user functional form to the postal facility in direct or indirect association with delivery of the batch of mail pieces to the postal facility for mailing, this step being indicated by the box 24. This can also be accomplished in a number of ways, depending primarily on the physical form of the user functional form of the compilation. For example, if the compilation is printed into hard copy form, the hard copy is typically delivered to the postal facility together with the delivery of the batch of mail pieces for mailing. Of course, the hard copy could be mailed or sent by some form of electronic communication such as facsimile, but in either event, the compilation is physically transferred to the postal facility. If the compilation is converted to a portable electronic data medium, such as a floppy disk, this can also be delivered to the postal facility together with delivery of the batch of mail for mailing, and the postal facility can then use the portable data medium to transfer the compilation to its own data processing instrumentality for storage and/or printing of a hard copy.

There is one situation in which the compilation can be transferred to the postal facility without the necessity of the step of converting it into a user functional form, since in this situation, the compilation is already in this form when it is created in the mailer's data processing instrumentality. This situation is where the compilation is transferred directly from the mailer's data processing instrumentality to the postal facility's data processing instrumentality by means of any suitable form of electronic data communication between the two data processing instrumentalities, such as electronic communication via modem and telephone lines. It is intended that this means of transferring the compilation from the mailer to the postal facility is within the scope of the invention notwithstanding that the compilation in the digital electronic form in the mailer's data processing instrumentality is already in a form that is suitable to this type of transfer from the mailer to the postal facility without the necessity of any further conversion of the data in the compilation to another physical form.

With the foregoing in mind, the apparatus of the present invention will now be described with reference to FIG. 2. The apparatus of the present invention may take a variety of forms, since there are a number of different components commercially available which can be assembled together in the unique manner of the present invention in order to accomplish the purpose of the invention. In describing the apparatus, reference will be made to so much of the foregoing description of the method of the invention as is necessary for a full and complete understanding of the apparatus.

Figure 2:
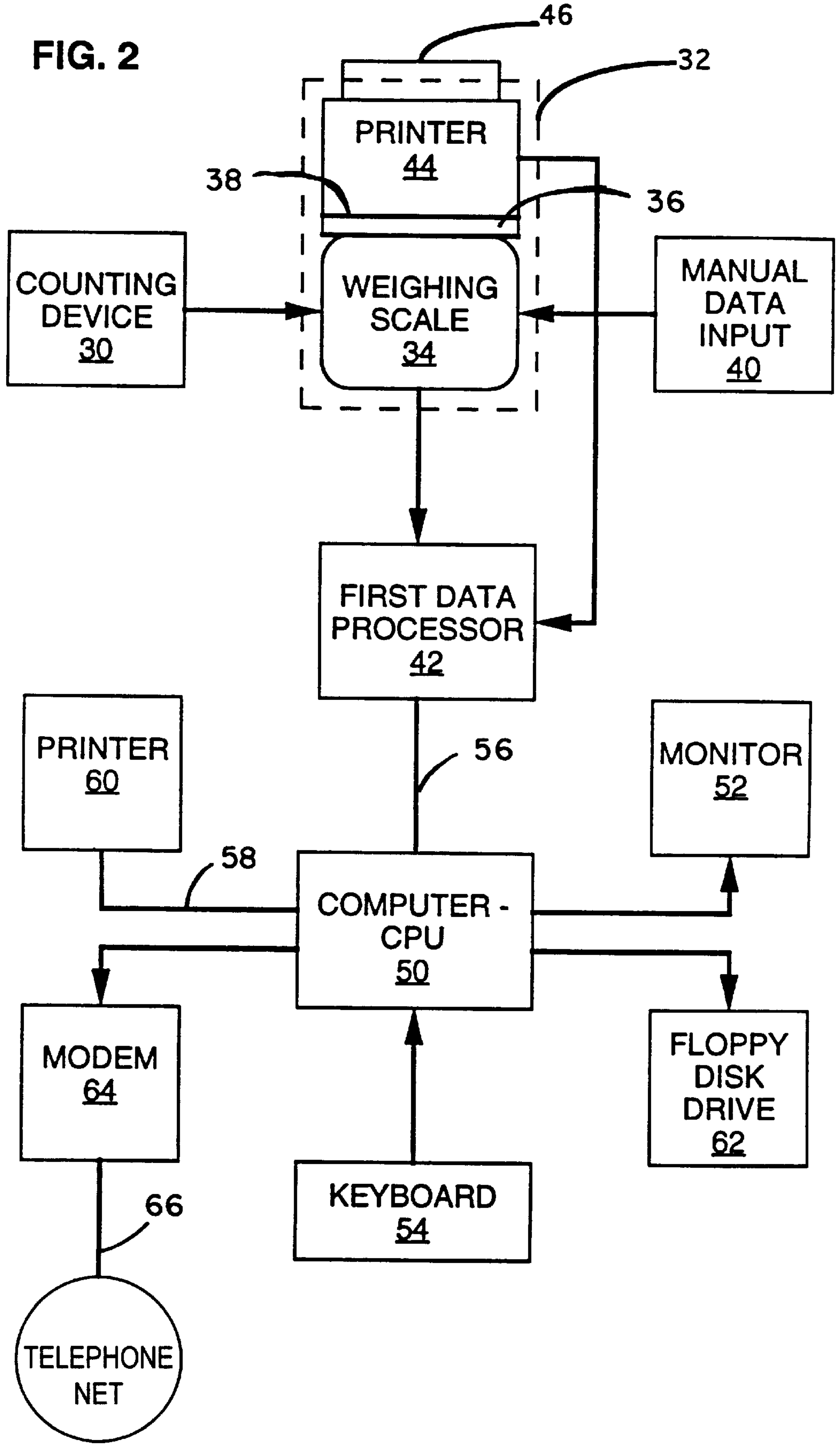
FIG. 2 is a schematic diagram representing the preferred form of the apparatus of the present invention.

As was previously described, it is necessary in carrying out the present invention to identify a discrete batch of mail pieces to be processed for mailing, and to accomplish this a suitable means is provided, as indicated by the box 30 in FIG. 2. This means may comprise any suitable mail piece counting device or machine which can simply count the number of pieces in a given stack of mail pieces. An alternative is to use a hand held digital electronic counting device, such as a hand held light pen which scans the upper edges of a stack of envelopes in much the same manner as a bar code scanner scans a bar code. Still another alternative is to utilize an automatic envelope feeder of the type normally found in commercially available high speed, high volume mailing machines, and adapt it to the weighing and printing device yet to be described, and providing the envelope feeder, if it is not already so provided, with the capability of keeping a running count of the number of the envelopes passing through it, and terminating the feeding when a predetermined desired count is reached. Thus, the specific type of counting mechanism utilized in the apparatus of the invention is not critical to carrying out the invention, so long as this function is carried out. It is, of course, possible for a person to take a batch of mail and manually count the number of pieces in the batch, and to the extent that this may be accomplished with or without any form of manual counting aid, this procedure is deemed to be within the scope of the claimed limitation of "means for identifying a discrete batch of mail pieces to be processed."

The apparatus of the invention further comprises an integral weighing and printing apparatus, designated generally by the reference numeral 32. The weighing and printing apparatus 32 comprises a scale 34, which is preferably in the form of an electronic scale such as any of a number of such scales marketed by Pitney Bowes Inc. and as shown in the aforementioned U.S. Pat. No. 4,787,046. The scale includes a platform 36 which, in the conventional use of the scale 34, supports mail pieces in the form of envelopes and packages which are to be weighed for the purpose of determining the amount of postage to be applied thereto for mailing. In the preferred form of the invention, however, a printing means 44, is placed on the platform 36 in the manner and for the purpose more fully described below.

The scale 34 typically includes a suitable form of data input device 40, which typically includes a suitable form of data mode selector and a numeric key pad. The data mode selector typically includes suitable means such as buttons for selecting the type of data to be entered into the scale, such as ZIP and zone codes, rate codes and codes for special services, etc.; the key pad is used to enter code numbers or numerical amounts relevant to the type of data selected.

The scale includes an integral first data processing means, indicated by the separate box 42, although typically the data processing means is part of the electronics package housed within the scale. The data processing means 42 includes a first data base in which the weight of a mail piece is entered automatically when the mail piece is weighed in the manner fully described below, together with any other data pertinent to the cost of mailing the mail piece which is entered manually through the data input device 40. The data processing means 42 is neither further shown nor described since the details thereof form no part of the present invention, and which may be found in the above referenced patent.

The weighing and printing apparatus 32 further includes a printing instrumentality, designated generally by the reference numeral 44 in FIG. 2. The printing instrumentality 44 is co-located with the scale 34 in that it is positioned on the platform 36 so that it becomes part of the tare weight of the scale 34, and it is operatively connected to the scale 34 so that it can input certain data pertinent to the cost of the mail piece as more fully described below.

The printing means 44 includes a forwardly opening slot 38 through which a mail piece can be moved manually for weighing and printing, or alternatively by any suitable type of mail piece feeding device, of which several are commercially available, so that a plurality of mail pieces can be moved through the slot 38 in succession without manual intervention. Since the manner in which mail pieces are presented to the printing instrumentality for weighing and printing is not an essential feature of the invention, neither further illustration nor description of any particular type of feeding device is deemed necessary.

The function of the printing means 44 is two fold, first to support the mail piece in the slot 38 so that the weight of the mail piece will be sensed by the scale and recorded in the data base of the data processing means 42, and second to print a unique identification number for each mail piece either on each mail piece that is put into or passed through the slot 38. Alternatively, the unique number can be printed on a piece of tape that is stored in the printing means 44 and is manually affixed to any mail piece that is too large or bulky to fit into the slot 38, or to packages, both of which can be weighed by simply placing the oversize mail piece or package on top of the printing means 44, as indicated by the box 46. The unique number may consist of just numeric characters, or a combination of alphanumeric characters. Thus, the printing instrumentality 44 includes a printing device (not shown) located within the printing means 44 in a position so that the unique number can be printed in a desired location on each mail piece. The printing device may be any of a variety of well know ink transfer, ink jet, thermal ribbon, etc., commercially available printing devices which are capable of printing a different number on each successive mail piece under the control of any suitable form of digitally controlled incrementing device or appropriate software, depending on the technology of the printing device utilized. It should be noted that since the printing means 44 is actually a part of the scale 34 so far as the weighing function is concerned, it does not matter whether the weighing function is completed before the printing function, or vice versa, or if both functions occur simultaneously, so long as the data is captured and is entered into the data base for later retrieval. Again, since the particular type of printing device is not significant to the invention, neither further illustration nor description is deemed necessary to a full understanding of the invention.

The processing apparatus of the present invention further comprises a second data processing means having a second data base. The second data processing means is typically a full featured computer having a suitable CPU 50, a monitor 52 and a keyboard 54, all of which is physically remote from the printing and weighing means 32 but operatively connected thereto, as indicated by the line 56, such that it can receive data from the first data base of the integral data processing means within the scale 34. The computer 50 includes suitable software for generating a digital electronic compilation of the data pertinent to the cost of mailing each of the mail pieces in the batch, with the data for each mail piece associated with the unique number printed on each mail piece, or on a label affixed to each mail piece, as the case may be, together with the actual total cost of mailing each mail piece.

A sample page of a hard copy printout of a representative digital electronic compilation of the information in the data base of the computer 50 is shown in FIG. 3, wherein it is seen that the left hand column headed "Piece ID" contains the unique number for all of the mail pieces in the batch; the next column headed "Weight" gives the weight in pounds of each mail piece; the next column headed "Ovr Siz" identifies the charges for over sized mail; the next column headed "Rate Code" identifies the class of mailing selected for each mail piece, with the key for the rate codes being set forth at the bottom of the page; the next column headed "Zip" identifies the ZIP code of the addressee; the next column headed "Zn" gives the postal zone code of each addressee relative to the location of the mailing facility receiving the batch of mail; the next column headed "Base Chg" gives the cost of mailing each mail piece based on the information already listed; the next column headed "Options" identifies various mailing options that are available for each mail piece, with the key for the option codes also be set forth at the bottom of the page; the next column headed "Total Fees" gives the charge for the options selected for each mail piece, if any; and finally the last column headed "Total Postage" gives the actual total cost for mailing each mail piece. Each page has a page total at the bottom of each column, together with corresponding cumulative totals for as many pages as there are in the manifest.

Once all this information has been gathered from the scale 34 and the printer 44 and assembled into a desired format such at that seen in FIG. 3, it must be converted from the digital form in the data base of the computer 50 into a user functional form. In a typical installation at the mailers location, the computer 50 is connected via a line 58 to a conventional computer printer 60, in which the compilation in the data base is printed out in hard copy form as shown in FIG. 3, recognizing that FIG. 3 illustrates but one page of a multi-page document, depending on the number of mail pieces in the batch and covered by the manifest. As indicated above in connection with the description of the method form of the invention, the manifest is typically delivered to the mailing facility along with the batch of mail, although other forms of physical delivery, such as mail, fax, etc., can be utilized.

The apparatus form of the invention further includes components and data connections that permit other forms of transferring the data compilation from the mailer to the postal facility. For example, the computer 50 typically has the capability of duplicating the compilation data on a portable electronic data medium 62, such as a floppy disk, tape, programmable CD-ROM, etc., which is delivered to the postal facility along with the batch of mail, and the postal facility then enters the data in its computer from which a hard copy can be printed.

Alternatively, there is a situation in which the data making up the compilation in the computer 50 can be transferred to the postal facility by utilizing electronic data communication of one form or another, without being converted into a user functional form by the mailer. In a typical situation, the mailer's computer 50 either includes an internal modem or is connected to an external modem 64 which, in turn, is connected to telephone lines indicated by the line 66. Thus, the mailer can connect his computer 50 to the computer at the mailing facility and send the digital electronic compilation directly to the computer at the postal facility, as by "e-mail." Other options available are modem file transfer and fax modem. Again, if desired, a hard copy of the compilation can be printed at the postal facility. Other options available are modem file transfer and fax modem.

It is to be understood that the present invention is not to be considered as limited to the specific embodiment described above and shown in the accompanying drawings, which is merely illustrative of the best mode presently contemplated for carrying out the invention and which is susceptible to such changes as may be obvious to one skilled in the art, but rather that the invention is intended to cover all such variations, modifications and equivalents thereof as may be deemed to be within the scope of the claims appended hereto.

What is claimed is:

1. A method of processing a batch of mail pieces by a mailer utilizing a manifesting system having a first data processing instrumentality, an integrated printer, and a weighing scale to evidence payment by the mailer to a postal facility for the cost of the mailing, said method comprising the steps of:

(a) establishing a tare weight at the weighing scale that comprises the weight of the printer;

(b) weighing each mail piece of the batch in succession to determine its weight after accounting for the tare weight;

(c) entering data into the first data base of the first data processing instrumentality, and wherein the data comprises at least the weight of each mail piece, and wherein the weight is pertinant to the cost of mailing each mail piece;

(d) assigning and printing a unique number associated with each one of the mail pieces;

(e) entering the unique number for each successive mail piece into data base associated with a second data processing instrumentality in association with the data pertinent to the cost of mailing;

(f) generating at the second data processing instrumentality a digital electronic compilation of the unique numbers of all of the mail pieces in the batch, together with the data pertinant to the cost of mailing each mail piece in the batch associated with each unique number, and the cost of mailing each mail piece as determined by the second data processing instrumentality based on the pertinent data;

(g) converting the digital electronic compilation in the second data base into a user functional form; and (h) transferring the compilation in the user functional form to the postal facility in direct or indirect association with delivery of the batch of mail pieces to the postal facility for mailing, whereby the compilation serves as evidence of payment by the mailer for the cost of transporting the mail pieces in the batch by the postal facility.

2. A method as set forth in claim 1 wherein the step of printing the unique number for each mail piece includes the step of printing the unique number directly on each mail piece in the batch at the time that the mail piece is weighed and the data pertinent to the cost of mailing is entered into the first data base.

3. A method as set forth in claim 1 wherein the step of printing the unique number on each mail piece includes the step of printing the unique number on a label for each mail piece in the batch at the time that the mail piece is weighed and the data pertinent to the cost of mailing is entered into the second data base, and then affixing the label to the appropriate mail piece.

4. The method as set forth in claim 1 wherein the step of entering data pertinent to the cost of mailing each mail piece into the first data base includes the step of entering into the data base other information for each mail piece in the batch which is relevant to the cost of mailing each mail piece.

5. A method as set forth in claim 1 wherein the step of converting the digital electronic compilation into user functional form includes the step of printing the compilation in hard copy form by a printing instrumentality operatively connected to the second data processing instrumentality.

6. A method as set forth in claim 5 wherein the step of transferring the compilation to the postal facility includes the step of delivering the hard copy form of the compilation to the postal facility together with delivery of the batch of mail pieces.

7. A method as set forth in claim 1 wherein the step of converting the digital electronic compilation into user functional form includes the step of transferring the compilation to a portable electronic data medium.

8. A method as set forth in claim 7 wherein the step of transferring the compilation to the postal facility includes the step of delivering the electronic data medium to the postal facility together with delivery of the batch of mail pieces.

9. A method as set forth in claim 1 wherein the step of transferring the compilation to the postal facility includes the step of transferring the pertinent data by means of electronic second data communication between the data processing instrumentality of the mailer and a data processing instrumentality of the postal facility.

10. A method as set forth in claim 1 wherein the unique number is printed in alphanumeric characters so as to be readable by OCR readers.

11. A method as set forth in claim 1 wherein the unique number is printed in bar code manner so as to be readable by a bar code scanner.

12. A method as set forth in claim 1 wherein the unique number is printed in two dimensional bar code so as to be readable by a two dimensional bar code scanner.

13. An apparatus for processing mail pieces by a mailer for mailing by a postal facility utilizing a manifesting system to evidence payment by the mailer to the postal facility for the cost of the mailing, said apparatus comprising:

(a) means for identifying a discrete batch of mail pieces to be prepared for mailing;

(b) weighing means for determining the weight of each mail piece, said weighing means including first data processing means for storing the weight of each mail piece in a first data base;

(c) first printing means collocated with and operatively connected to said weighing means for printing at least a unique number for each mail piece and transferring said unique number to said first data processing means for storage in said first data base;

(d) second data processing means operatively connected to said weighing means for receiving the weight for each mail piece and entering said weight into a second data base, said second data processing means including means for generating a digital electronic compilation of said unique numbers of all the mail pieces in said batch together with the data pertinent to the cost of mailing of each mail piece associated with each unique number and the cost of mailing of each mail piece as determined by said second data processing means; and (e) means for converting said digital electronic compilation into a user functional form which can be transferred by the mailer to the postal facility, whereby said compilation serves as evidence of payment by the mailer for the cost of mailing the mail pieces in the batch by the mailing facility.

14. An apparatus as set forth in claim 13 wherein said first printing means is disposed on said weighing means so as to form part of the tare weight of said weighing means.

15. An apparatus as set forth in claim 14 wherein said first printing means includes means for receiving normal size mail pieces within said printing means for printing said unique number directly on each mail piece in the batch commensurate with said mail piece being weighed.

16. An apparatus as set forth in claim 15 wherein said first printing means includes means for supporting oversized mail pieces and packages for weighing, and means for printing said unique number on a label for each mail piece in the batch commensurate with said mail piece being weighed.

17. An apparatus as set forth in claim 16 wherein said weighing means includes user operable input means for entering into said first data base other information for each mail piece in the batch which is pertinent to the cost of mailing each mail piece, and which is transferred to said second data base together with said weight information.

18. An apparatus as set forth in claim 17 wherein said means for converting said digital electronic compilation into a user functional form comprises second printing means operatively connected to said second data processing means for printing said compilation in hard copy form for delivery to said postal facility together with said batch of mail pieces.

19. An apparatus as set forth in claim 17 wherein said means for converting said digital electronic compilation into a user functional form comprises means for storing said unique number, said weight and said other pertinent information, if any, on a portable electronic data medium for delivery to said postal facility with said batch of mail pieces for printing in hard copy form at said postal facility.

20. An apparatus as set forth in claim 16 wherein said means for converting said digital electronic compilation into a user functional form comprises electronic data communication means operatively connected between said second data processing means and a data processing means located at said postal facility, so that said compilation can be sent electronically directly to said postal facility for printing in hard copy form at said postal facility.

* * * * *